(12) United States Patent
Rosplock (10) Patent No.: US 7,276,898 B2
(45) Date of Patent: Oct. 2, 2007

(54) LONG STROKE HALL POSITION SENSOR HAVING A SHAPED POLE

(75) Inventor: James D. Rosplock, Roscoe, IL (US)

(73) Assignee: Woodward Governor Company, Rockford, IL (US)

( * ) Notice: Subject to any disclaimer, the term of this patent is extended or adjusted under 35 U.S.C. 154(b) by 5 days.

(21) Appl. No.: 11/315,561

(22) Filed: Dec. 22, 2005

(65) Prior Publication Data

US 2007/0145969 A1   Jun. 28, 2007

(51) Int. Cl.
*G01R 33/07* (2006.01)
*G01B 7/14* (2006.01)
(52) U.S. Cl. ............... 324/207.2; 324/207.24; 324/251; 324/174
(58) Field of Classification Search ........ 324/173–174, 324/207.24–207.26, 207.2, 251
See application file for complete search history.

(56) References Cited

U.S. PATENT DOCUMENTS 3,817,150 A * 6/1974 Cox ............................. 91/186
5,497,081 A * 3/1996 Wolf et al. ............. 324/207.12

* cited by examiner

*Primary Examiner*—Bot LeDynh
(74) *Attorney, Agent, or Firm*—Reinhart Boerner Van Deuren P.C.

(57) ABSTRACT

An apparatus having a position sensor for determining a position of a moveable component is provided. The apparatus comprises a housing, a positioning member, a shaped magnetic pole, a magnet, and a hall effect sensor. The positioning member, the shaped magnetic pole, the magnet, and the hall effect sensor are each disposed within the housing. The positioning member is operably coupled to the moveable component and moveable relative to the housing. The magnet induces a magnetic flux in the shaped magnetic pole. One of the shaped magnetic pole and the magnet move in conjunction with the positioning member. The hall effect sensor is adapted to sense an intensity of the magnetic flux in the shaped magnetic pole and generate an output corresponding to the sensed intensity such that the position of the moveable component can be determined.

21 Claims, 6 Drawing Sheets

LONG STROKE HALL POSITION SENSOR HAVING A SHAPED POLE

FIELD OF THE INVENTION

This invention generally relates to a position sensor and, more particularly, to a position sensor integrated into products.

BACKGROUND OF THE INVENTION

Air-driven engines such as aircraft engines typically include components that alter, direct, and/or guide the flow of air to improve performance. These components are generally positioned using an actuator. The actuator can be a conventional hydraulic actuator or a more specialized "fueldraulic" actuator which uses fuel as a hydraulic fluid. In either case, the actuator is called upon to move the air-directing components into one of a variety of positions such that the flow of air is directed through the engine as needed.

In order to ensure that the air-directing components have been appropriately positioned, the actuator typically includes a position sensor and a controller (e.g., an integrating controller, a proportional controller, and the like). The position sensor senses an actual position of the actuator, which directly correlates to the actual position of the air-directing component, and the controller ensures that a commanded position for the actuator matches the actual sensed position. Since the actual position of the air-directing component is determined based on information provided by the position sensor, the accuracy of the position sensor is important.

In many applications, the actuators are equipped with a position sensor known as a linear variable differential transducer (LVDT). The LVDT is an electronic device that outputs a particular electrical position feedback (e.g., an induced voltage) depending on position. By observing the electrical position feedback for one or more characteristics (e.g., magnitude and phase change), the position of the actuator and, more importantly, the position of the air-directing component can be determined. Therefore, as the actuator continually moves and transitions the air-directing component into one of a variety of possible positions, the LVDT operably coupled to the actuator generates a varying electrical position feedback that can be correlated to a varying position of the air-directing component.

Unfortunately, the LVDT's employed by the actuators are costly, both in terms of time and money, and are relatively heavy. The LVDT's are also relatively large in physical size and require a vast amount of space to be added to the actuator. In many circumstances, the LVDT's are so generously proportioned that the actuators have to be made much larger than functionally required to accommodate and house the LVDT's. Also, the LVDT's use small gauge wires that are prone to failure. Therefore, when using the LVDT as the position sensor, additional redundancy (e.g., two separate position sensors) is usually built into the positioning system. This added redundancy increase the overall cost of meeting strict reliability requirements. In an aircraft environment, the excessive size and weight and failure modes are detrimental to the life cost of the aircraft. In addition, the LVDT's generally require complex circuitry to provide the proper input signal as well as to demodulate the output signal. From the foregoing, it can be appreciated that the actuators using the LVDT's to sense the position of the air-directing components have significant drawbacks.

From the foregoing, it can be seen that an actuator that employs a relatively small, lightweight sensor adapted to sense the position of an air-directing component in a cost-efficient and reliable manner would be desirable. The invention provides such an actuator. These and other advantages of the invention, as well as additional inventive features, will be apparent from the description of the invention provided herein.

BRIEF SUMMARY OF THE INVENTION

In one aspect, the invention provides an apparatus having a position sensor for determining a position of a moveable component. The apparatus comprises a housing, a positioning member, a shaped magnetic pole, and a hall effect sensor. The positioning member, a shaped magnetic pole, and a hall effect sensor are disposed within the housing. The positioning member is operably coupled to the moveable component and moveable relative to the housing. The magnet induces a magnetic flux in the shaped magnetic pole. One of the shaped magnetic pole and the magnet move in conjunction with the positioning member. The hall effect sensor is adapted to sense an intensity of the magnetic flux in the shaped magnetic pole and generate an output corresponding to the sensed intensity. As such, the position of the moveable component can be determined.

In another aspect, the invention provides an apparatus for determining a position of a moveable component. The apparatus comprises a housing, a positioning member, a shaped magnetic pole, and a hall effect sensor. The positioning member, a shaped magnetic pole, and a hall effect sensor are disposed within the housing. The positioning member is operably coupled to the moveable component and moveable relative to the housing. The positioning member includes a magnet. The shaped magnetic pole is secured to the housing. The shaped magnetic pole extends into the positioning member and passes proximate the magnet. The magnet induces a flux in the shaped magnetic pole. The hall effect sensor is adapted to sense an intensity of the magnetic flux in the shaped magnetic pole. The hall effect sensor generates an output corresponding to the sensed intensity. As such, the position of the moveable component can be determined.

In yet another aspect, the invention provides a position sensor for determining a position of a moveable component. The position sensor is located within a housing of a positioning device and has a positioning member that moves the position of the moveable component. The position sensor comprises a shaped magnetic pole, a magnet, and a hall effect sensor within the housing. The magnet induces a magnetic field in the shaped magnetic pole. One of the shaped magnetic pole and the magnet are attached to the positioning member. As such, the one of the shaped magnetic pole and the magnet move in conjunction with movement of the positioning member. The hall effect sensor is mounted within the housing and adapted to sense an intensity of the magnetic field induced in the shaped magnetic pole. The hall effect sensor generates an output corresponding to the intensity of the magnetic field. As such, the position of the moveable component can be determined.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The invention provides an apparatus for determining a position of a moveable component. As will be more fully explained below, the apparatus advantageously employs a relatively small, lightweight hall effect sensor to sense the position of the moveable component (e.g., an air-directing component) in a cost-efficient and reliable manner. While the apparatus is adaptable to a variety of different applications and potentially beneficial in a host of diverse industries, the apparatus is particularly useful in an aircraft engine and otherwise in the aircraft industry. In the description that follows, the invention will be described utilizing an hydraulic actuator. The invention is not limited to an actuator environment. It may be used in environments where a control piston and the like are used, such as by way of example and not limitation, fuel valves, metering valves, etc. The invention may also be used with pneumatic actuators, valves, etc.

Figure 1:
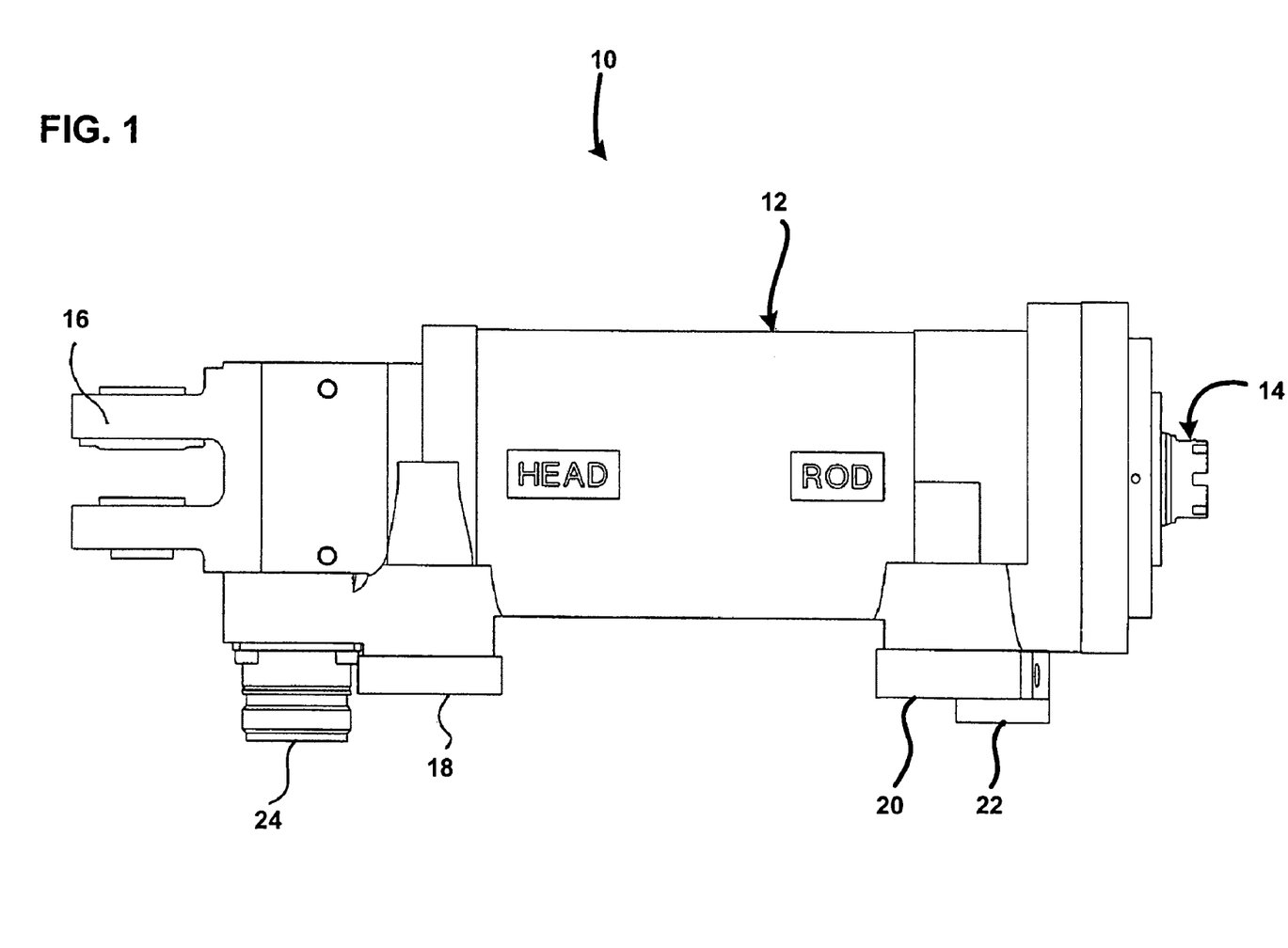
FIG. 1 is a side elevation view of an exemplary embodiment of an apparatus for determining a position of a moveable component constructed in accordance with the teachings of the present invention.
Figure 2:
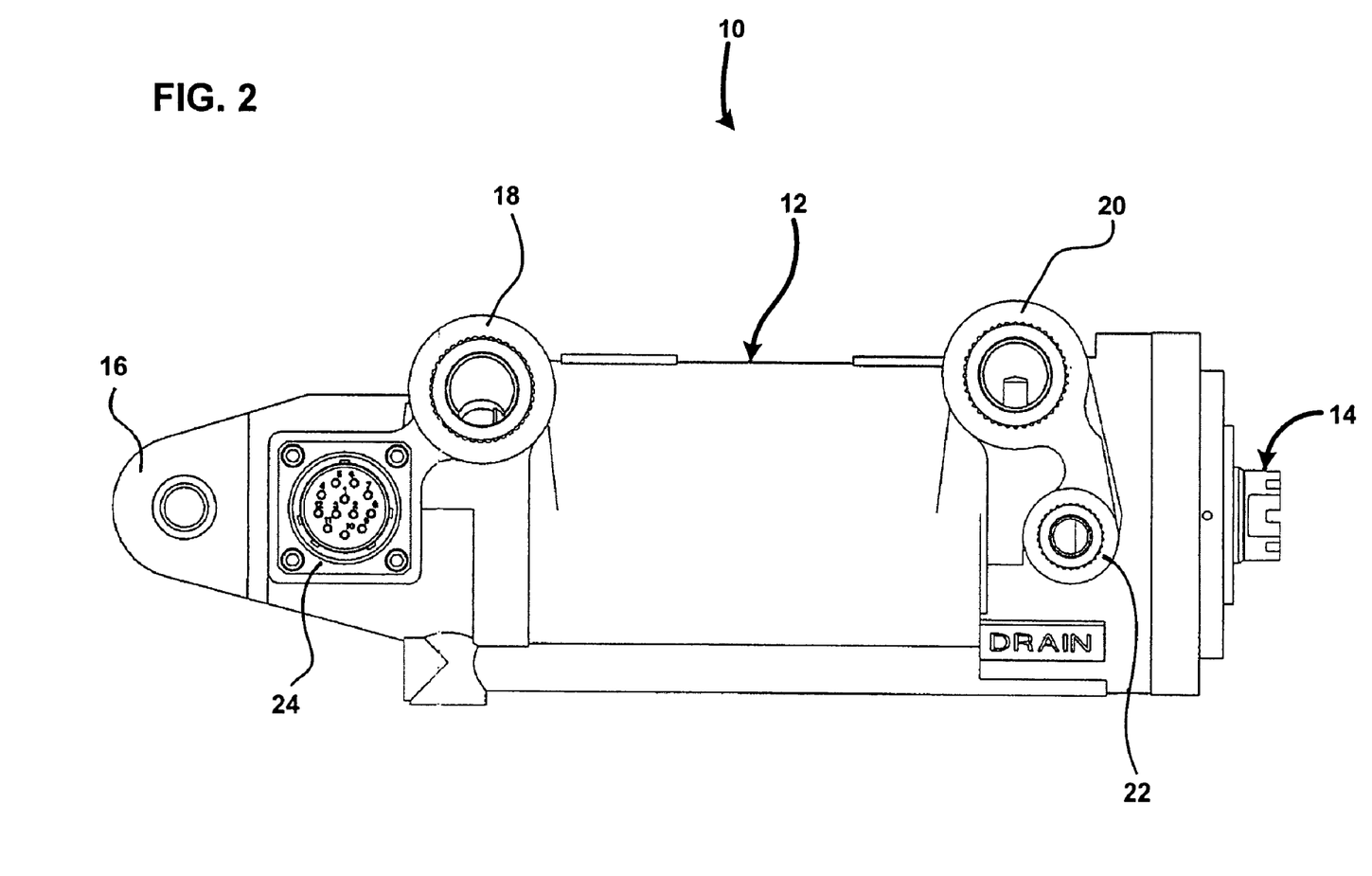
FIG. 2 is a bottom plan view of the apparatus of FIG. 1.

Referring to both FIGS. 1 and 2, the apparatus illustrated as an actuator 10 includes a housing 12 and a positioning member such as an actuator piston 14 moveably disposed within the housing. The housing 12 includes an anchor point or anchor 16 adapted to couple with, for example, a fixed portion of the body of an aircraft. The housing 12 also includes a pair of hydraulic couplings 18, 20, a hydraulic drain coupling 22, and an electronic coupling 24. In one embodiment, the housing 12 is constructed of a material that provides sufficient electromagnetic interference shielding for the invention to operate in the environment in which the invention is installed. In another embodiment, the housing 12 is constructed from a material that provides little or no magnetic shielding. In the latter embodiment, the housing 12 is formed in such a manner so as to provide a distance through which a magnetic field would have to traverse before reaching electrical components within the housing 12. The distance, in effect, provides the shielding.

As well know by those skilled in the art, the hydraulic couplings 18, 20 are configured to receive and expel a hydraulic fluid to move the piston 14 while the hydraulic drain coupling 22 is configured to drain the hydraulic fluid as needed. The hydraulic fluid provided to the actuator 10 can be any generally incompressible fluid, and in some cases, comprises fuel used to operate an engine on the aircraft. In those situations, the actuator 10 is referred to as a "fueldraulic" actuator. The electronic coupling 24 is adapted to connect with electronic circuitry on the aircraft such that signals, data, and/or information can be transmitted between the actuator 10 and the aircraft.

The housing 12 may have one or more labeling indicia. For example, as shown in FIGS. 1-2, markings such as the words "head", "rod", and "drain" can be placed on or in the housing 12. These labels provide can provide guidance or a reference during, for example, installation, repair, and inspection of the actuator 10.

Figure 3:
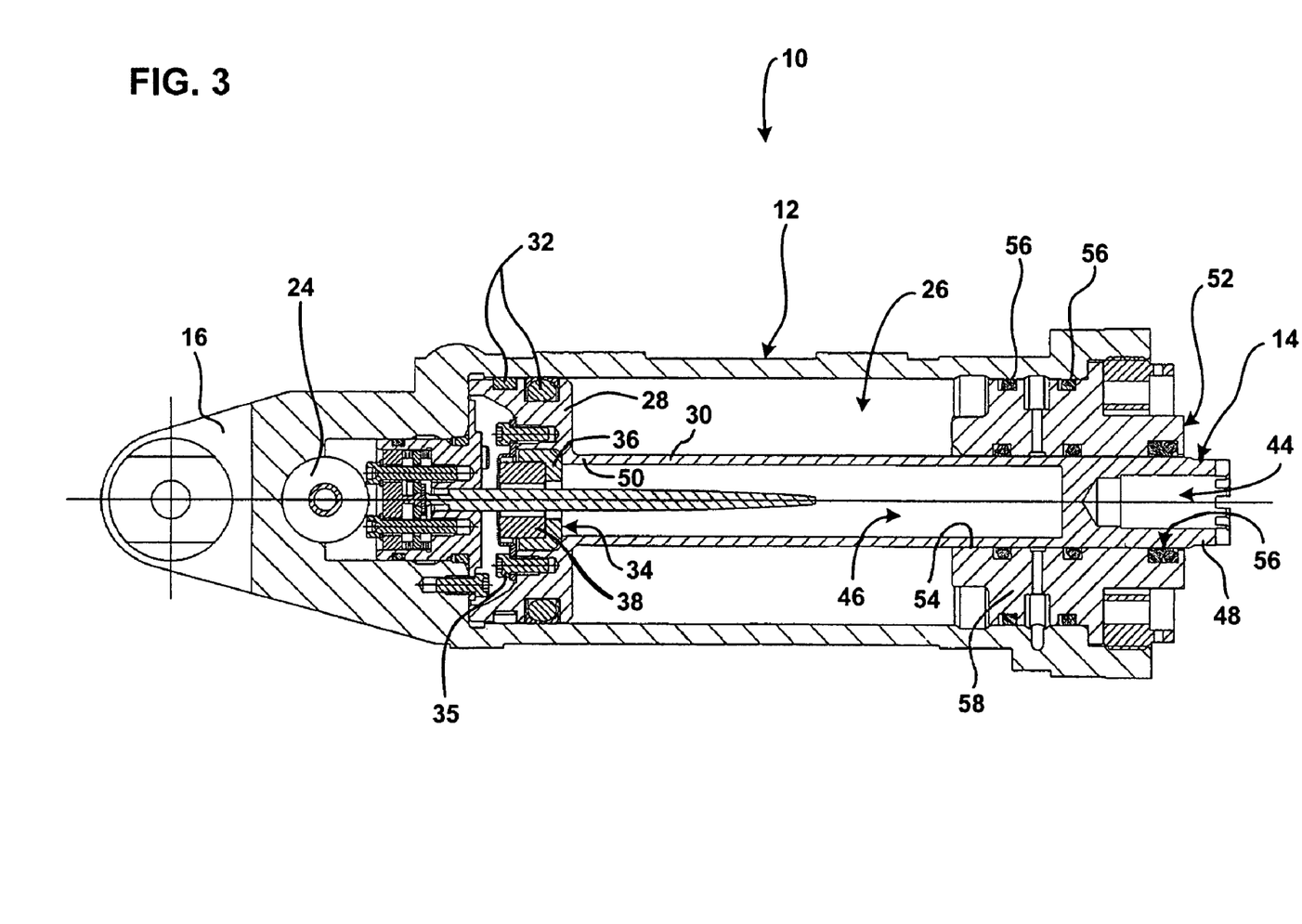
FIG. 3 is a cross sectional view of the apparatus of FIG. 2 highlighting a magnet, a shaped magnetic pole, and a hall effect sensor disposed within the apparatus in accordance with the teachings of the present invention.
Figure 4:
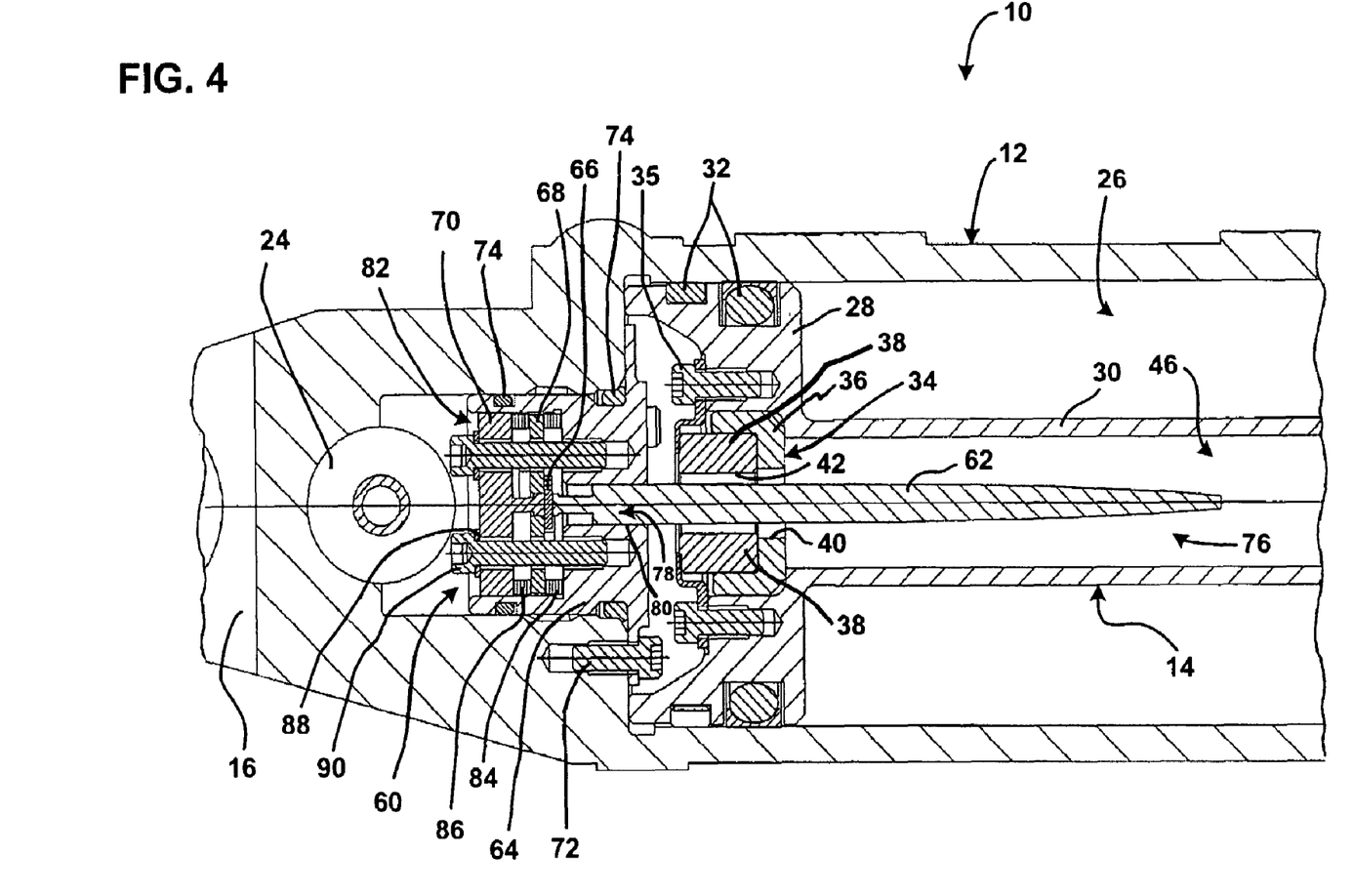
FIG. 4 is a cut-away portion of the apparatus of FIG. 3.

Turning now to FIG. 3, the piston 14 is shown disposed in a central bore 26 axially formed within the housing 12. In the illustrated embodiment, the piston 14 is a substantially hollow "T-shaped" member that comprises a transverse portion known as a head 28 and a cylindrical portion known as a rod 30. The head 28 includes one or more seals 32, which can be of differing types, and a magnet assembly 34. The seals 32 are generally disposed between the head 28 and the housing 12 to promote sealing and inhibit or prevent a hydraulic fluid from undesirably passing from one side of the head to another. The magnetic assembly 34, which is secured to the head 28 by threaded members 35, comprises a support body 36 and a magnet 38. As best shown in FIG. 4, the support body 36 generally supports the magnet 38 and includes an assembly aperture 40. In a preferred embodiment, the magnet 38 is annular and forms a magnet aperture 42 that is axially aligned with the assembly aperture 40. An annularly shaped magnet reduces the effects of eccentricity and magnet non-uniformity.

Referring back to FIG. 3, the rod 30 of the piston 14 includes a first piston bore 44 and a second piston bore 46. The first piston bore 44 is axially formed in a first end 48 of the rod 30 and is adapted to be coupled with a moveable component. In one embodiment, the first piston bore 44 is threaded. As such, the first piston bore 44 is able to threadably mate with a correspondingly threaded portion of the moveable component or a member (e.g., a push rod) connected to the moveable component.

The second piston bore 46 is formed through the head 28 of the piston 14 and extends axially into and through a second end 50 of the rod 30. In the illustrated embodiment, the second piston bore 46 terminates just short of the first piston bore 44. As such, the rod 30 of the piston 14 is generally a hollow shaft. As illustrated, the first and second piston bores 44, 46 are generally axially aligned with each other. Also, as depicted in FIG. 4, the second piston bore 46 is generally axially aligned with the assembly aperture 40 in the support body 36 of the magnet assembly 34 as well as the magnet aperture 42.

The piston 14 is moveably retained within the central bore 26 of the housing 12 by a piston cover 52. As illustrated in FIG. 3, the piston cover 52 is secured within the housing 12 to enclose the central bore 26. The piston cover 52 provides a central aperture 54 and includes a plurality of seals 56. The central aperture 54 is adapted to slideably receive the rod 30 of the piston 14. The seals 56, which can be a variety of different types of seals, are interposed between the rod 30 of the piston 14 and a body 58 of the piston cover. The seals 56 are also interposed between the body 58 of the piston cover 52 and the housing 12. As such, any hydraulic fluid present in the central bore 26 is inhibited or prevented from undesirably escaping from the actuator 10. Notably, the seals 56 that are in intimate contact with the rod 30 are adapted to permit reciprocal movement of the piston 14 while still deterring or preventing leakage of the hydraulic fluid.

Referring again to FIG. 4, a sensor assembly 60 is illustrated. The sensor assembly 60 comprises a shaped magnetic pole 62, a body 64, a hall effect sensor 66 electrically mounted to a circuit board 68, and a magnetic element 70. The sensor assembly 60 is secured to the housing 12 by threaded members 72. Seals 74 are generally disposed between the body 64 and the housing 12 to promote sealing and inhibit or prevent a hydraulic fluid from undesirably passing from one side of the body to another.

The shaped magnetic pole 62 is an elongate member that is preferably formed from a soft magnetic material or an alloy of such materials. As well known in the art, a soft magnetic material is magnetized in the presence of a magnetic field but then reverts to a near zero magnetism when the magnetic field is removed whereas a hard magnetic material can be permanently magnetized.

The shaped magnetic pole 62 can be formed into a variety of different geometries with a variety of different dimensions. In a preferred embodiment, a first end 76 of the shaped magnetic pole 62 has a cross sectional area that attenuates as the shaped magnetic pole extends away from the body 64 of the sensor assembly 60. In other words, the shaped magnetic pole 62 is generally tapered over its length. In another embodiment, all or a portion of the shaped magnetic pole 62 has a constant cross sectional area over its length.

As best shown in FIG. 4, a second end 78 of the shaped magnetic pole 62 is secured to the body 64 of the sensor assembly 60. Therefore, the shaped magnetic pole 62 is indirectly secured to the housing 12 of the actuator 10 and remains stationary relative to the housing. In a preferred embodiment, the second end 78 is secured to the body 64 by a brazing weld 80 (i.e., a brazing joint). Attached in such an arrangement, the shaped magnetic pole 62 projects outwardly and away from the sensor assembly 60 and generally passes by the magnet 38 in the head 28 of the piston 14. Preferably, as illustrated in FIGS. 3 and 4, the shaped magnetic pole 62 passes directly through the magnet aperture 42. By permitting the shaped magnetic pole 62 to extend directly through the magnet aperture 42, the effects of magnet alignment and non-uniformity are reduced or eliminated altogether.

During operation, a magnetic flux (i.e., a magnetic field) is induced in the shaped magnetic pole 62 by the magnet 38 due to the proximity of the magnet to the shaped magnetic pole and the fact that the shaped magnetic pole is formed from a soft magnetic material. The intensity of the magnetic flux induced in the shaped magnetic pole 62 is determined by several factors. For example, the particular type of soft magnetic material used to form the shaped magnetic pole will affect the intensity. Also, the cross sectional area of the shaped magnetic pole proximate the magnet 38 and the type of medium interposed between the magnet and the shaped magnetic pole will influence the intensity. Since the shaped magnetic pole 62 is formed from a soft magnetic material, the magnetic flux produced by the magnet 38 travels a much greater distance than if the medium proximate the magnet was another medium such as, for example, air.

Still referring to FIG. 4, the body 64 of the sensor assembly 60 generally forms a cavity 82 that houses the circuit board 68, the hall effect sensor 66, and the magnetic element 70. As illustrated, the circuit board 68 is seated upon a spacer or shim 84 within the cavity 82 and is therefore somewhat offset from the body 64. In this configuration, the hall effect sensor 66 is oriented to be in close proximity to the second end 78 of the shaped magnetic pole 62. The hall effect sensor 66, as well known by those skilled in the art, is an electronic device that varies its direct current (DC) output voltage in response to changes in the intensity of a magnetic field. Therefore, as the intensity of the magnetic field at the second end 78 of the shaped magnetic pole 62 increases and decreases, the hall effect sensor outputs a correspondingly increased or decreased output voltage. The hall effect sensor 66 can be a single channel sensor or a dual channel sensor.

The circuit board 68 can include capacitors and/or other electronic components to reduce signal noise and increase resistance to electrostatic discharge (ESD). In addition, the circuit board 68 can include electronic components that permit the circuit board to survive lightning strikes, to handle power disturbances, and the like.

With the circuit board 68 and hall effect sensor 66 appropriately positioned, a further shim 86 is stacked upon the circuit board 68 and the magnetic element 70 is seated upon that shim. The magnetic element 70 is preferably a second soft magnetic pole that is placed on an opposite side of the hall effect sensor 66 as the shaped magnetic pole 62. The magnetic element 70 is adapted to increase the magnetic flux observed by the hall effect sensor 66. The magnetic element 70 can be shaped to tailor the output as desired. With the foregoing components occupying the cavity 82, the components are secured to the body 64 by washers 88 and threaded members 90. The washers 88 and the threaded members 90 are preferably made from a non-magnetizable material. Although not shown, the circuit board 68 and the hall effect sensor 66 are electrically coupled to the electronic coupling 24.

In operation, the actuator 10 operates in some aspects much like a conventional or standard actuator. For example, when hydraulic fluid is introduced into the hydraulic coupling 20, the piston 14 is hydraulically driven toward the anchor such that the piston is fully retracted and generally disposed entirely within the housing 12. In contrast, when hydraulic fluid is introduced into the hydraulic coupling 18, the piston 14 is hydraulically driven away from the anchor 16 until the piston is fully extended and prominently projects from the housing 12. By reciprocally moving the piston 14 within the central bore 26 between the fully retracted and fully extended positions, the piston can be used to move the moveable component.

In addition to simply moving the piston 14, the actuator 10 is also able to determine a position of the piston 14 using the hall effect sensor 66. The hall effect sensor 66 senses the intensity of magnetic flux, which was induced in the shaped magnetic pole 62 by the magnet 38, proximate the second end 78 of the shaped magnetic pole. When the piston 14 is fully retracted and the magnet 38 is as close to the hall effect sensor 66 as possible, a maximum amount of magnetic flux is induced in the shaped magnetic pole and sensed by the hall effect sensor. The hall effect sensor 66 senses the intensity of magnetic flux and outputs a correspondingly higher voltage through the electronic coupling 24 than when the piston 14 is not fully retracted.

As the piston 14 is moved away from the anchor 16, the magnet 38 in the piston moves relative to the stationary shaped magnetic pole 62 and is pushed farther away from the hall effect sensor 66. As the magnetic path (e.g., the distance between the magnet 38 and the hall effect sensor 66 through the shaped magnetic pole 62 and the distance between the magnet 38 and the magnetic element 70 (i.e., the second pole) through the air) increases and the geometry (i.e., the diminishing cross section) of the shaped magnetic pole changes, the intensity of the magnetic flux sensed by the hall effect sensor decreases. As a result, the hall effect sensor 66 outputs a new corresponding voltage through the electronic coupling 24. When the piston 14 is fully extended and the magnet 38 is as far away from the hall effect sensor 66 as possible, a minimum amount of magnetic flux is induced in the shaped magnetic pole and sensed by the hall effect sensor. The hall effect sensor 66 senses that the intensity of magnetic flux is lower and outputs a correspondingly lower voltage through the electronic coupling 24 than when the piston is fully retracted. As those skilled in the art will recognize, by monitoring the varying output voltage produced by the hall effect sensor 66, the position of the piston 14 relative to the housing 12 can be determined by correlation.

Also, by particularly configuring the geometry, dimensions, and/or material of each of the shaped magnetic pole 62 and the magnet 38, the output voltage generated by the hall effect sensor 66 can be particularly tailored. For example, the above-noted properties can be arranged such that the output voltage of the hall effect sensor 66 and the stroke characteristic of the piston 14 have an approximately linear or other desired relationship.

In one embodiment, the hall effect sensor 66 generates an output of about two and a half volts when no magnet 38 is present in the piston 14 and inducing a magnetic flux in the shaped magnetic pole 62. Therefore, an offset of about another two and a half volts can be supplied by other circuitry and, in one embodiment, by the hall effect sensor 66 itself. This offset can be either a negative or positive voltage such that the output voltage of the hall effect sensor can begin at either about positive five or about zero volts.

When a positive two and a half volts is used as the offset, the hall effect sensor outputs a maximum voltage of about five volts when the piston 14 is fully retracted. The output of about five volts signifies that the piston 14 is in the fully retracted position. When the piston 14 begins to move away from the hall effect sensor 66, the voltage begins to linearly decrease until the piston reaches a fully extended position and the output is about zero volts. The output of about zero volts signifies that the piston is in the fully extended position. The output voltage generated by the hall effect sensor 66 preferably remains generally linear over the range of travel of the piston from the fully retracted to fully extended positions. Therefore, when the piston 14 is approximately at mid-stroke in the foregoing example, the output voltage produced by the hall effect sensor 66 should be around two and a half volts. However, as previously indicated, the output voltage can be tailored to be non-linear. For example, the shape of the shaped magnetic pole 62 may be changed such that there is increased position accuracy at predetermined positions.

As those skilled in the art will appreciate, a second magnet or bias magnet (not shown) can be placed proximate the face of the hall effect sensor 66 opposite the shaped magnetic pole 62 to center the magnetic flux level at the mid-stroke position of the piston 14. This can reduce or eliminate the need to offset the output voltage of the hall effect sensor 66 and can improve accuracy.

Figure 5:
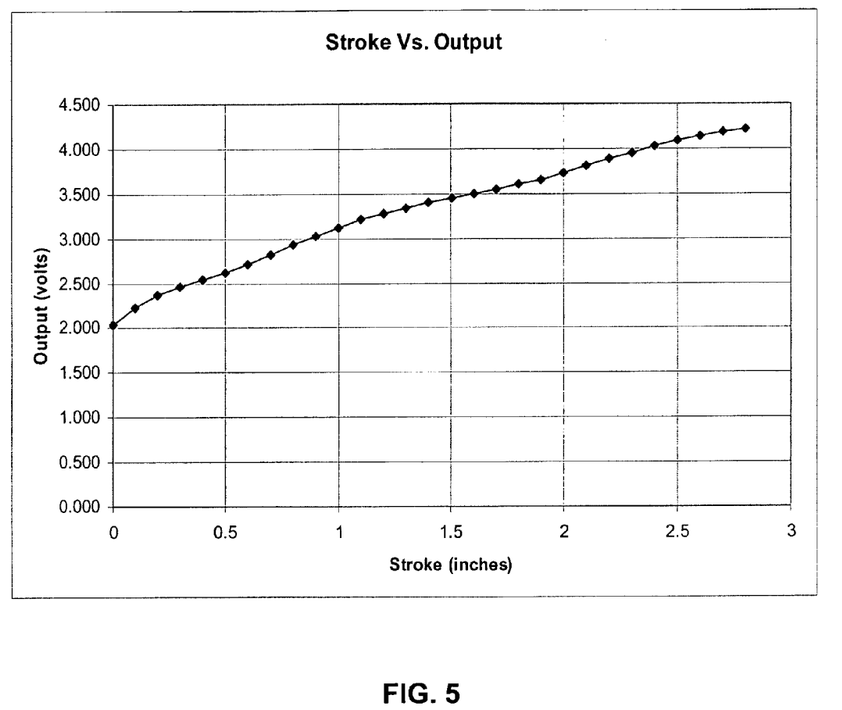
FIG. 5 is a graph illustrating a generally linear stroke versus output for one embodiment of the apparatus of FIG. 1.
Figure 6:
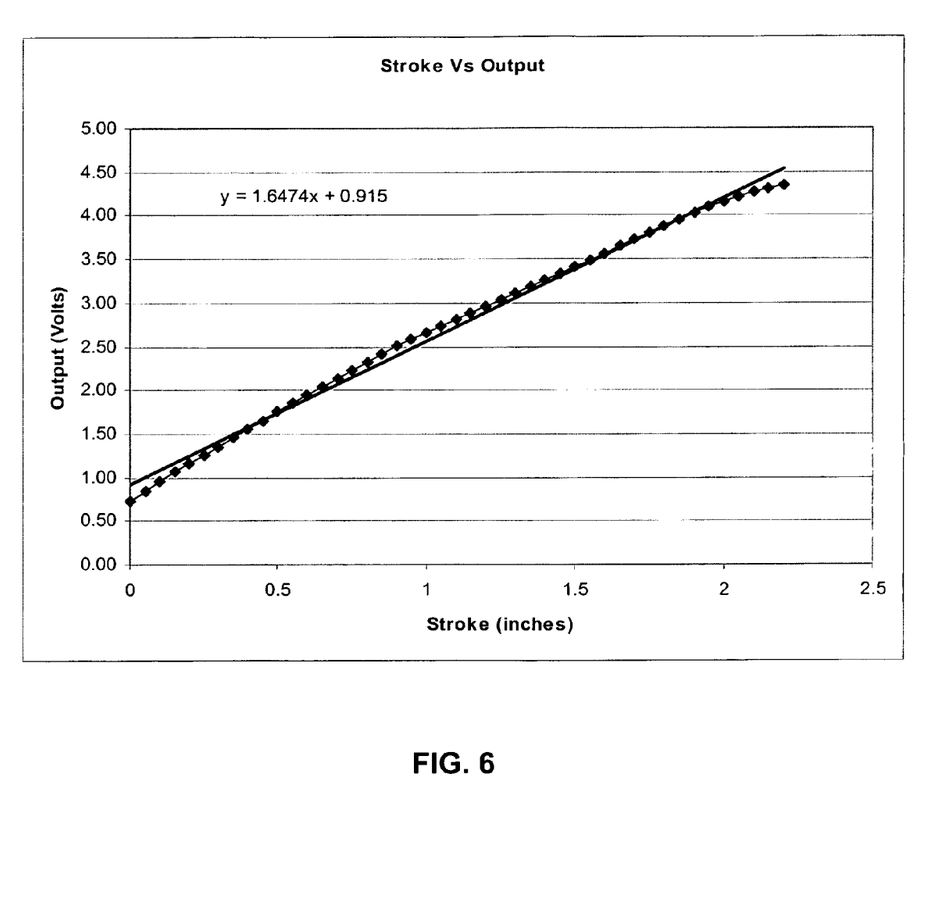
FIG. 6 is a graph illustrating a two inch stroke linearity for one embodiment of the apparatus of FIG. 1.

As depicted in FIG. 5, one embodiment of the present invention generated test data that was able to graphically illustrate the linearity of stroke (in inches) versus output (in volts. As shown in FIG. 6, one embodiment of the present invention generated test data that was able to graphically illustrate a two inch stroke linearity by comparing stroke (in inches) versus output (in inches).

From the foregoing, it can be seen that the apparatus advantageously employs a relatively small, lightweight hall effect sensor to sense the position of the moveable component in a cost-efficient and reliable manner.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus having a linear position sensor for determining a linear position of a moveable component, the apparatus comprising:
    a housing;
    a positioning member within the housing, the positioning member operably coupled to the moveable component and moveable relative to the housing;
    a shaped magnetic pole within the housing;
    a magnet within the housing, the magnet inducing a magnetic flux in the shaped magnetic pole, one of the shaped magnetic pole and the magnet moving in conjunction with the positioning member; and
    a hall effect sensor within the housing, the hall effect sensor adapted to sense an intensity of the magnetic flux in the shaped magnetic pole, the hall effect sensor generating an output corresponding to the sensed intensity such that the linear position of the moveable component can be determined.

2. The apparatus of claim 1, wherein the positioning member is moveable using at least one of a pneumatic fluid and fuel as a hydraulic fluid.

3. The apparatus of claim 1, wherein the sensed intensity is determined by one or more of a length of a magnetic path between the magnet and the hall effect sensor, a type of soft magnetic material forming the shaped magnetic pole, and an amount and type of medium interposed between the magnet and the shaped magnetic pole.

4. The apparatus of claim 1, wherein the housing is formed from a material that provides electromagnetic interference shielding to the apparatus.

5. The apparatus of claim 1, wherein the shaped magnetic pole is secured to the housing by a brazing joint.

6. The apparatus of claim 1, wherein the hall effect sensor is adapted to sense the intensity of the magnetic flux proximate an end of the shaped magnetic pole.

7. The apparatus of claim 1, wherein the magnet is an annular magnet having a central aperture, the shaped magnetic pole passing through the central aperture of the annular magnet.

8. The apparatus of claim 1, wherein the shaped magnetic pole is formed from a soft magnetic material.

9. The apparatus of claim 1, wherein a cross sectional area of the shaped magnetic pole diminishes as the shaped magnetic pole extends away from the hall effect sensor.

10. The apparatus of claim 1, wherein at least a portion of the shaped magnetic pole has a constant cross sectional area as the shaped magnetic pole extends away from the hall effect sensor.

11. An apparatus for determining a position of a moveable component, the apparatus comprising:
a housing;
a positioning member within the housing, the positioning member operably coupled to the moveable component and moveable relative to the housing, the positioning member including a magnet;
a shaped magnetic pole within and secured to the housing, the shaped magnetic pole extending into the positioning member and passing proximate the magnet, the magnet inducing a flux in the shaped magnetic pole;
a hall effect sensor within the housing, the hall effect sensor adapted to sense an intensity of the magnetic flux in the shaped magnetic pole, the hall effect sensor generating an output corresponding to the sensed intensity such that the position of the moveable component can be determined.

12. The apparatus of claim 11, wherein the sensed intensity is determined by one or more of a length of a magnetic path between the magnet and the hall effect sensor, a type of soft magnetic material forming the shaped magnetic pole, and an amount and type of medium interposed between the magnet and the shaped magnetic pole.

13. The apparatus of claim 11, wherein the positioning member is a piston having a central bore and the magnet is an annular magnet having a central aperture, the shaped magnetic pole passing through the central aperture and extending into the central bore.

14. The apparatus of claim 11, wherein the hall effect sensor is adapted to sense the intensity of the magnetic flux proximate an end of the shaped magnetic pole.

15. The apparatus of claim 11, wherein the shaped magnetic pole is formed from a soft magnetic material and a cross sectional area of the shaped magnetic pole diminishes as the shaped magnetic pole extends away from the hall effect sensor.

16. The apparatus of claim 11, wherein the hall effect sensor provides an approximately linear output relative to a stroke of the positioning member.

17. The apparatus of claim 11, wherein the output of the hall effect sensor is a direct current voltage between about zero and about five volts.

18. The apparatus of claim 11, wherein the apparatus includes a second magnetic pole formed of a soft magnetic material, the second magnetic pole disposed on a side of the hall effect sensor opposite the shaped magnetic pole, the second magnetic pole increasing the magnetic flux delivered to the hall effect sensor.

19. The apparatus of claim 11, wherein the apparatus includes a second magnet, the second magnet disposed on a side of the hall effect sensor opposite the shaped magnetic pole, the second magnet centering the intensity of the magnetic flux at a mid-stroke of the positioning member.

20. A linear position sensor for determining a linear position of a moveable component, the linear position sensor located within a housing of a positioning device having a positioning member that moves the position of the moveable component, the linear position sensor comprising:
a shaped magnetic pole within the housing;
a magnet within the housing, the magnet inducing a magnetic field in the shaped magnetic pole, one of the shaped magnetic pole and the magnet attached to the positioning member such that the one of the shaped magnetic pole and the magnet moves in conjunction with movement of the positioning member; and
a hall effect sensor mounted within the housing, the hall effect sensor adapted to sense an intensity of the magnetic field induced in the shaped magnetic pole, the hall effect sensor generating an output corresponding to the intensity of the magnetic field such that the linear position of the moveable component can be determined.

21. The position sensor of claim 20, wherein the hall effect sensor is adapted to sense the intensity of the magnetic flux proximate an end of the shaped magnetic pole.

* * * * *